(12) United States Patent
Cheon et al.

(10) Patent No.: US 7,853,262 B2
(45) Date of Patent: Dec. 14, 2010

(54) METHOD AND SYSTEM FOR ALLOCATING RESOURCES IN A COMMUNICATION SYSTEM

(75) Inventors: Jung-Hoon Cheon, Suwon-si (KR); Jae-Ki Lee, Daegu (KR); Hwang-Soo Lee, Seongnam-si (KR); Chang-Hyun Nam, Busan (KR); Soo-Bin Lee, Choongju-si (KR)

(73) Assignees: Samsung Electronics Co., Ltd (KR); Korea Advanced Institute of Science & Technology (KAIST) (KR)

( * ) Notice: Subject to any disclaimer, the term of this patent is extended or adjusted under 35 U.S.C. 154(b) by 981 days.

(21) Appl. No.: 11/703,597

(22) Filed: Feb. 7, 2007

(65) Prior Publication Data

US 2007/0201404 A1 Aug. 30, 2007

(30) Foreign Application Priority Data

Feb. 7, 2006 (KR) .................. 10-2006-0011658

(51) Int. Cl.
*H04W 72/00* (2009.01)
(52) U.S. Cl. .................. 455/450; 455/453; 455/509; 455/513; 370/310; 370/322; 370/329; 370/332
(58) Field of Classification Search ......... 370/329–337, 370/332, 310; 455/450–453, 464, 509–513
See application file for complete search history.

(56) References Cited

U.S. PATENT DOCUMENTS

| 6,859,655 B2 * | 2/2005 | Struhsaker .................. 455/450 |
|---|---|---|
| 7,236,474 B2 | 6/2007 | Seo et al. |
| 7,639,650 B2 | 12/2009 | Cho et al. |
| 2002/0141367 A1 | 10/2002 | Hwang et al. |
| 2004/0203476 A1 | 10/2004 | Liu |
| 2005/0025254 A1* | 2/2005 | Awad et al. .................. 375/295 |
| 2006/0007880 A1* | 1/2006 | Terry .......................... 370/328 |
| 2006/0176869 A1* | 8/2006 | Cheng et al. ................. 370/345 |
| 2007/0121542 A1* | 5/2007 | Lohr et al. .................. 370/329 |
| 2007/0281695 A1* | 12/2007 | Lohr et al. .................. 455/436 |

FOREIGN PATENT DOCUMENTS

EP 1 306 985 A1 5/2003

(Continued)

OTHER PUBLICATIONS

Chao et al., A Dynamic Resource Allocation Method for HSDPA in WCDMA System, $5^{th}$ IEE International Conference on 3G Mobile Communication Technologies, Oct. 20, 2004, pp. 569-573.
Ratasuk et al., Predicting Link Level Performance for Enhanced Uplink, 2004 Vehicular Technology Conference, Sep. 26-29, 2004, pp. 4185-4189.

(Continued)

*Primary Examiner*—Kamran Afshar
*Assistant Examiner*—Chuong A Ngo
(74) *Attorney, Agent, or Firm*—The Farrell Law Firm, LLP (57) ABSTRACT

Provided are a system and a method for allocating resources in a communication system. The method includes mapping a Transmission Time Interval (TTI) class according to channel information transmitted from a mobile station and service class information of the mobile station; and allocating resources by dynamically configuring a frame based on the mapped TTI class.

18 Claims, 9 Drawing Sheets

FOREIGN PATENT DOCUMENTS

| | | |
|---|---|---|
| EP | 1 355 442 A1 | 10/2003 |
| KR | 1020020079453 | 10/2002 |
| KR | 1020030037611 | 5/2003 |
| KR | 1020040032044 | 4/2004 |
| KR | 1020050081840 | 8/2005 |

OTHER PUBLICATIONS

Aniba et al., Fast Packet Scheduling Assuring Fairness and Quality of Service in HSDPA, 2004 Canadian Conference on Electrical and Computer Engineering, May 2-5, 2004, pp. 2243-2246.

* cited by examiner

METHOD AND SYSTEM FOR ALLOCATING RESOURCES IN A COMMUNICATION SYSTEM

PRIORITY

This application claims priority under 35 U.S.C. §119(a) to an application filed in the Korean Intellectual Property Office on Feb. 7, 2006 and assigned Serial No. 2006-11658, the entire contents of which are incorporated herein by reference.

BACKGROUND OF THE INVENTION

1. Field of the Invention

The present invention relates generally to a communication system, and in particular, to a method and system for allocating resources by controlling a Transmission Time Interval (TTI) in a communication system.

2. Description of the Related Art

Technologies for providing users with data services in current wireless communication environments are classified into $2.5^{th}$ or $3^{rd}$ generation cellular mobile communication technologies such as Code Division Multiple Access 2000 1x Evolution Data Optimized (CDMA2000 1xEVDO), General Packet Radio Services (GPRS) and Universal Mobile Telecommunication Service (UMTS) and Wireless Local Area Network (WLAN) technologies such as an Institute of Electrical and Electronics Engineers (IEEE) 802.11 wireless LAN and the like.

Given the development of mobile communication technologies, various LAN wireless access technologies such as an IEEE 802.16 based WLAN and the like are appearing. The LAN wireless access technologies are being provided as an alternative plan for providing a high-speed data service in a wireless environment by replacing a wired communication network such as a cable modem or Digital Subscriber Line (xDSL) with the WLAN in one of a home network environment and a hot spot area such as a public place or school.

However, when the above-described WLAN provides the high-speed data service, there are limitations in providing users with public network services due to propagation interference as well as very limited mobility and limited service coverage.

Efforts at various stages are being made for overcoming these limitations. For example, a large amount of research is being conducted on a mobile Internet technology to compensate for the weak points of the cellular mobile communication system and the WLAN. A mobile Internet system can provide a high-speed data service using various types of Mobile Stations (MSs) in indoor/outdoor stationary environments and mobile environments at pedestrian rate of speed and medium/low speed (of about 60 Km/h).

Alternatively, research is also being conducted on wireless access technologies of future Long-Term Evolution (LTE) in the $3^{rd}$ Generation Partnership Project (3GPP) system. As an example of the wireless access technologies, schemes are provided for efficiently controlling a downlink Transmission Time Interval (TTI) in a communication system based on Orthogonal Frequency Division Multiplexing (OFDM)/Orthogonal Frequency Division Multiple Access (OFDMA).

The conventional system provides a concept of a fixed TTI, whereas the 3G LTE provides only a concept of an adaptive TTI for Quality of Service (QoS) guarantee and control signal reduction.

Next the fixed and adaptive TTI concepts are described below with reference to a 3GPP High-Speed Downlink Packet Access (HSDPA) communication system corresponding to a Code Division Multiple Access (CDMA) system and an OFDM/OFDMA communication system.

Figure 1:
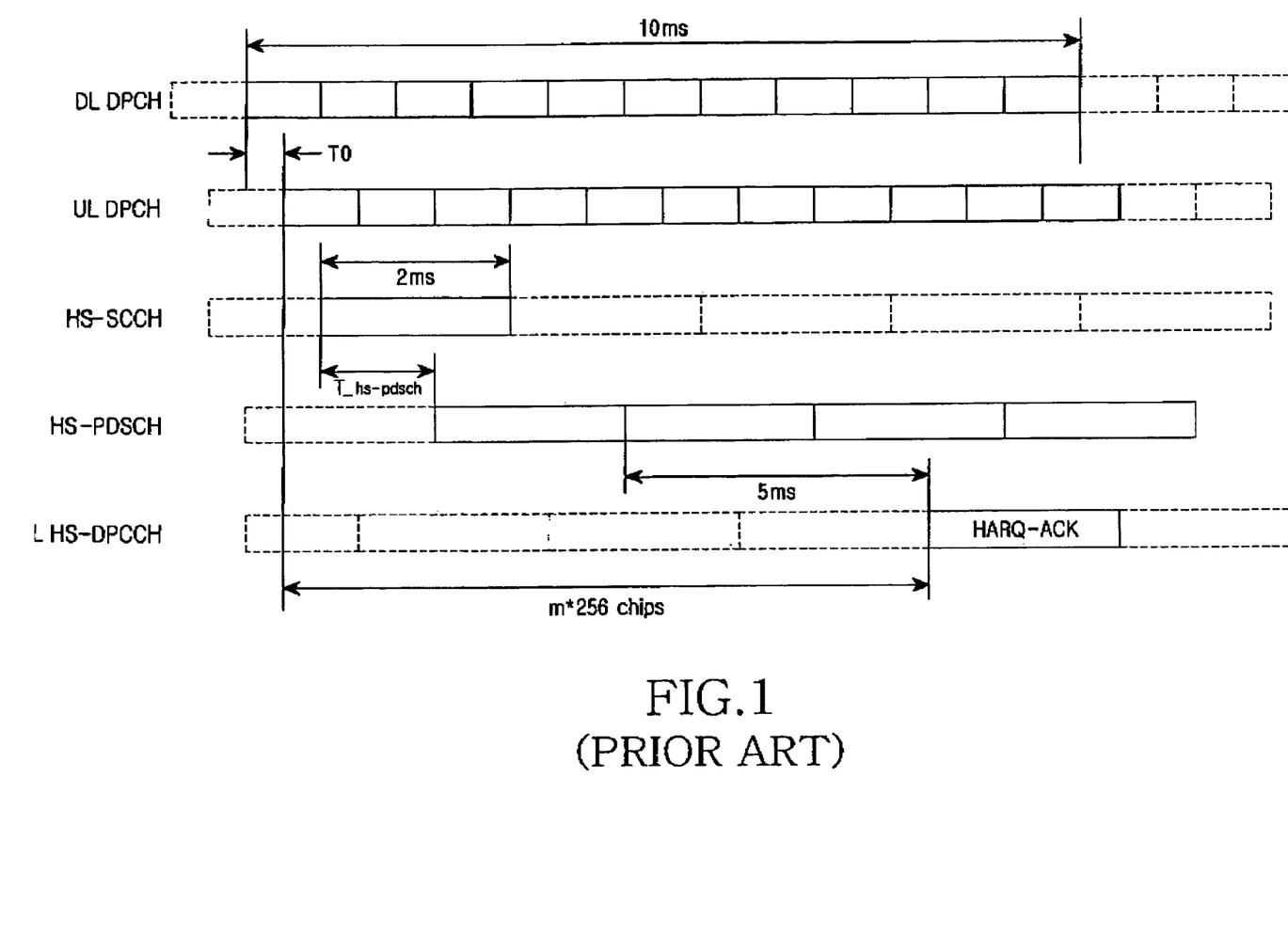
FIG. 1 illustrates an information exchange procedure using channels in a conventional High-Speed Downlink Packet Access (HSDPA) system.

FIG. 1 illustrates an information exchange procedure using channels in a conventional HSDPA communication system. In particular, FIG. 1 illustrates a TTI in the 3GPP HSDPA system. For convenience of explanation, the HSDPA system defines a TTI of 2 ms.

Referring to FIG. 1, the HSDPA system configures a Medium Access Control (MAC) Packet Data Unit (PDU) in a period of 2 ms. Hybrid Automatic Repeat reQuest (HARQ) signaling information and Channel Quality Information (CQI) are fed back in every MAC PDU.

A TTI control scheme of the above-described HSDPA system has a structure unsuitable for a low latency requirement in the 3G LTE. That is, the 3G LTE requires Radio Access Network (RAN) Round Trip Time (RTT) latency of less than 10 ms. The 3G LTE provides a minimum TTI unit of 0.5 ms. The TTI and latency provided in the 3G LTE can be expressed as shown in Table 1 and Equation (1) below.

TABLE 1

$$RANlatency(RTT) \approx 2 \times (6.5TTI+0.5)ms < 10\ ms \quad \text{Equation (1)}$$

The OFDM/OFDMA communication system does not use the above-described TTI concept. In the OFDM/OFDMA communication system, the TTI concept can be compared with a MAC frame configuration concept. The OFDM/OFDMA communication system has a frame unit of 5 ms, such that the low latency requirement of the 3G LTE is not reflected. In the OFDM/OFDMA communication system, a user service characteristic is not reflected due to a fixed frame length.

For this reason, the throughput of the OFDM/OFDMA communication system may be reduced due to a frame overhead, for example, MAP signaling. There is a problem in that it is difficult to reflect a channel characteristic based on fast fading because of the fixed frame length. In this case, a shorter frame length is required.

Figure 2:
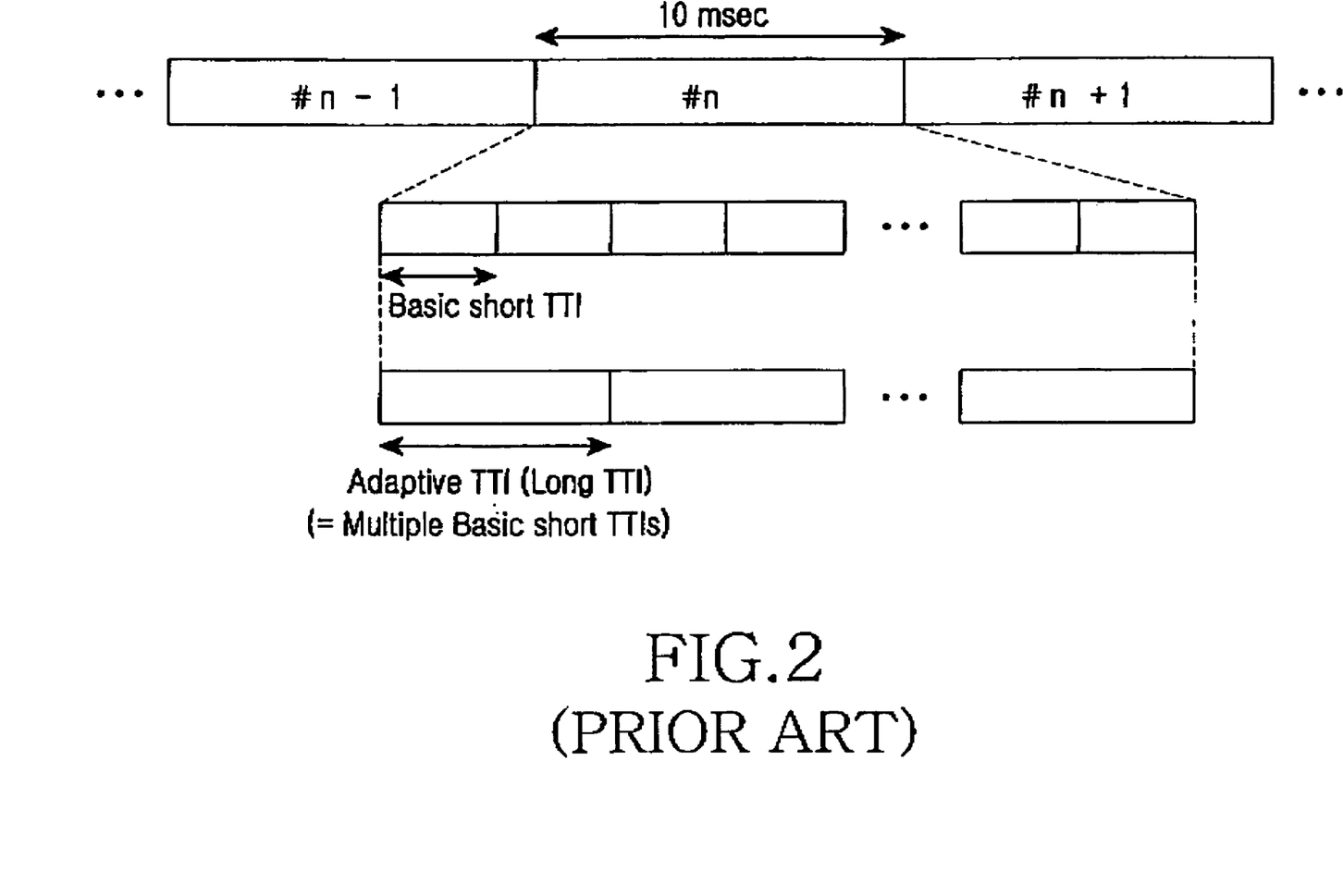
FIG. 2 illustrates an adaptive Transmission Time Interval (TTI) concept defined in a conventional communication system.

The adaptive TTI for QoS guarantee and control signal reduction are described herein. FIG. 2 illustrates an adaptive TTI concept defined in the conventional communication system. Specifically, FIG. 2 illustrates radio frame and TTI configurations defined in the conventional 3GPP LTE. The 3GPP LTE only provides the adaptive TTI concept, but it does not provide a concrete scheme thereof.

The problems in a fixed TTI and a fixed frame structure are described herein.

As described above, the 3GPP HSDPA communication system has the fixed TTI of 2 ms and the OFDM/OFDMA communication system has the fixed frame structure of 5 ms. In this case, there is a problem in that a service characteristic of user traffic may not be reflected in the communication system. For example, when burst traffic is simultaneously transmitted, overhead of a MAC header may occur. Moreover, there is a problem in that the communication system may not reflect a low latency requirement of the 3GPP LTE and is unsuitable for rapid variation in a channel environment. When the channel environment is good, there is a problem in that an unnecessarily short TTI may cause overhead of a MAC PDU header in the 3GPP HSDPA communication system, MAP overhead in the OFDM/OFDMA communication system, and uplink signaling overhead.

In comparison with the CDMA communication system, the above-described OFDM/OFDMA communication system has more flexibility in resource allocation of a symbol/subcarrier unit. However, the OFDM/OFDMA communication system may have the above-described problems due to the fixed frame structure.

In the 3GPP LTE, a basic TTI of 0.5 ms is considered and the necessity for an adaptive TTI that is capable of realizing QoS desired by users is only proposed. A concrete control scheme is not provided in the 3GPP LTE.

Thus, there exists a need for a scheme for optimizing and controlling a TTI and allocating resources according to channel states and service characteristics of user traffic in the case where a channel state and traffic requiring low latency rapidly vary, in the case where low latency is not required and a channel state and burst traffic do not rapidly vary, and in the case where rapid adaptation to a channel state is not required.

SUMMARY OF THE INVENTION

It is, therefore, an object of the present invention to address at least the above described problems and/or disadvantages and to provide at least the advantages described below. Accordingly, an object of the present invention is to provide a method and system for allocating resources in a communication system.

Another object of the present invention is to provide a method and system for allocating resources by controlling a transmission time interval (TTI) in a communication system.

Still another object of the present invention is to provide a method and system for allocating resources through TTI control by considering a service characteristic and a channel state of a downlink channel in a communication system.

Still further another object of the present invention is to provide a resource allocation method and system for dynamically configuring a frame by selecting a TTI from among a predetermined number of TTIs on the basis of a downlink traffic characteristic and channel information.

Yet still further an object of the present invention is to provide a resource allocation method and system that can control a packet delay through TTI control based on a service and that can reduce an uplink control packet through TTI control based on a channel state in a communication system.

Another further object of the present invention is to provide a resource allocation method and system that can increase data throughput by reducing Medium Access Control (MAC) overhead.

In accordance with an aspect of the present invention, there is provided a method for allocating resources in a communication system. The method includes mapping a TTI class according to channel information transmitted from a mobile station and service class information of the mobile station; and allocating resources by dynamically configuring a frame based on the mapped TTI class.

In accordance with another aspect of the present invention, there is provided a method for allocating resources in a communication system. The method includes classifying a packet according to service class information and channel information when the packet is transmitted from a higher layer; selecting a subframe category of the classified packet; performing scheduling for the selected subframe category; and allocating resources according to the scheduling.

In accordance with still another aspect of the present invention, there is provided a system for allocating resources in a communication system. The system includes a mobile station for periodically transmitting downlink channel information to a base station; and the base station for accumulating the channel information transmitted from the mobile station, selecting a TTI according to a service characteristic of downlink traffic transmitted from the mobile station and the channel information transmitted from the mobile station, and allocating resources by dynamically configuring a frame according to the selected TTI.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF PREFERRED EMBODIMENTS

Preferred embodiments of the present invention will be described in detail herein below with reference to the accompanying drawings. Descriptions of well-known functions and constructions are omitted for clarity and conciseness.

The present invention provides a method and system for allocating resources in a communication system. The present invention provides a method and system for allocating resources by controlling a class based Transmission Time Interval (TTI) by considering channel and service characteristics in a communication system. The present invention provides a TTI control system and method based on a class concept reflecting not only a user traffic characteristic but also a channel state. Simply, the present invention can efficiently control a size of a Medium Access Control (MAC) transport block by controlling a TTI on the basis of the user traffic characteristic and the channel state in a communication system. Moreover, the present invention can improve throughput degradation due to MAC overhead and can minimize delay.

Next a scheme for allocating resources by controlling a class based TTI by considering a service and a channel state in accordance with the present invention will be described below.

The present invention provides a method and system for allocating resources to a receiver, for example, a Mobile Station (MS), for receiving a communication service by controlling a TTI based on a class dependent on a channel state and a downlink service of a transmitter, for example, a Base Station (BS), for providing the communication service in a communication system based on Orthogonal Frequency Division Multiplexing (OFDM)/Orthogonal Frequency Division Multiple Access (OFDMA). That is, in the present invention, a TTI class is determined by a service and a channel state between the BS and the MS. The present invention can subdivide the TTI class into a predetermined number of classes by considering complexity to allocate resources.

Next, examples of a conceptual structure in accordance with the present invention will be described with reference to FIGS. 3 and 4.

Figure 3:
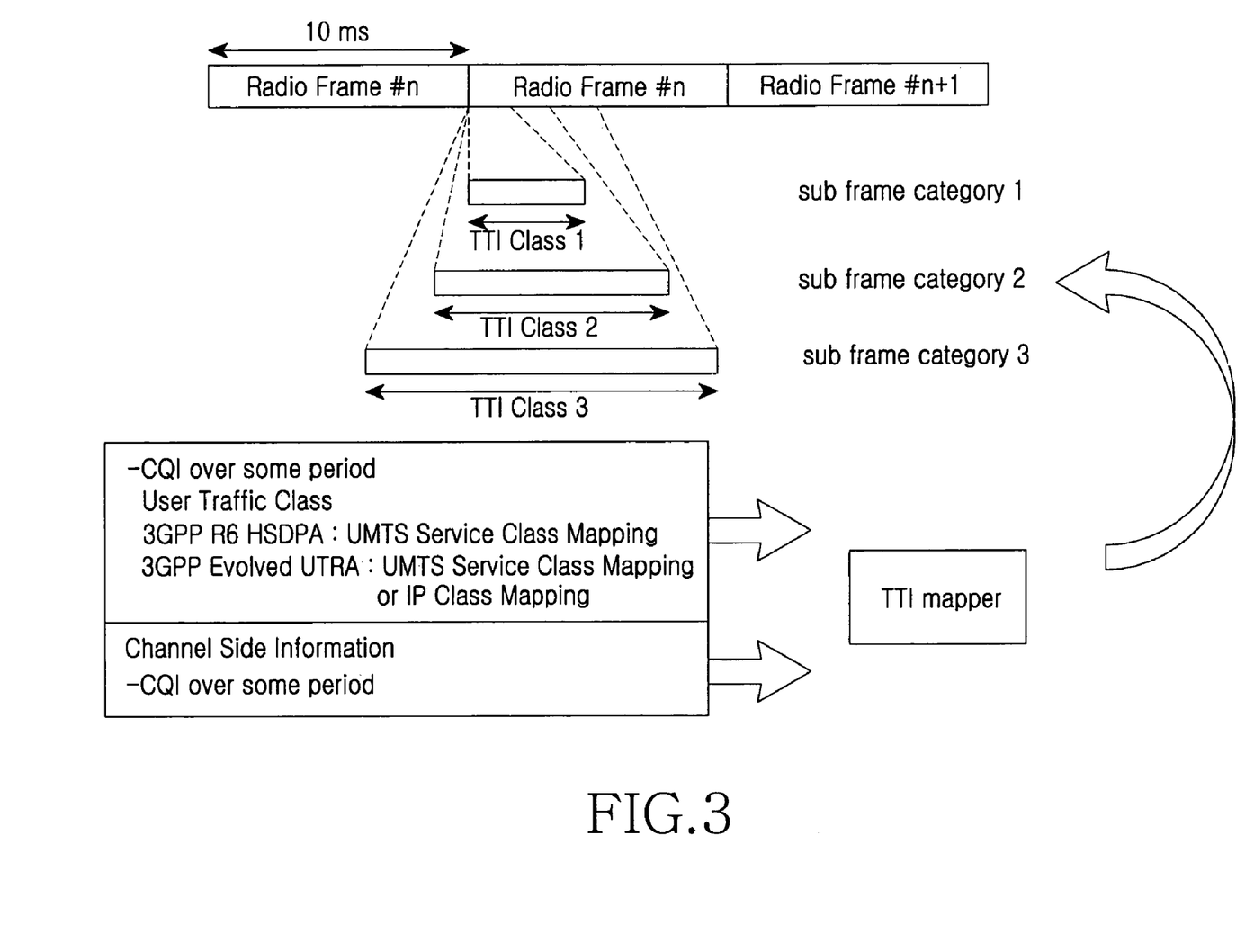
FIG. 3 illustrates a TTI control structure using a TTI mapper in accordance with the present invention.

FIG. 3 illustrates a TTI control structure using a TTI mapper in accordance with the present invention.

Referring to FIG. 3, a Universal Mobile Telecommunications System (UMTS) user traffic class uses information of service classes, for example, an Unsolicited Grant Service (UGS), real-time Polling Service (rtPS), extended real-time Polling Service (ertPS), non-real-time Polling Service (nrtPS) and Best Effort Service (BES), in the case of a 3$^{rd}$ Generation Partnership Project (3GPP) High-Speed Downlink Packet Access (HSDPA) communication system. Moreover, the user traffic class can use Internet Protocol (IP) service class information in the case of 3GPP future Long-Term Evolution (LTE). The channel information can use a value computed by averaging Channel Quality Information (CQI) in a regular period. For example, a TTI class can be subdivided into three classes. A subframe configuration differs according to TTI class.

One of three subframes is selected and used through the TTI mapper by reflecting a user service characteristic and a channel state. At this time, a basic radio frame is maintained in 10 ms while considering backward complexity.

Figure 4:
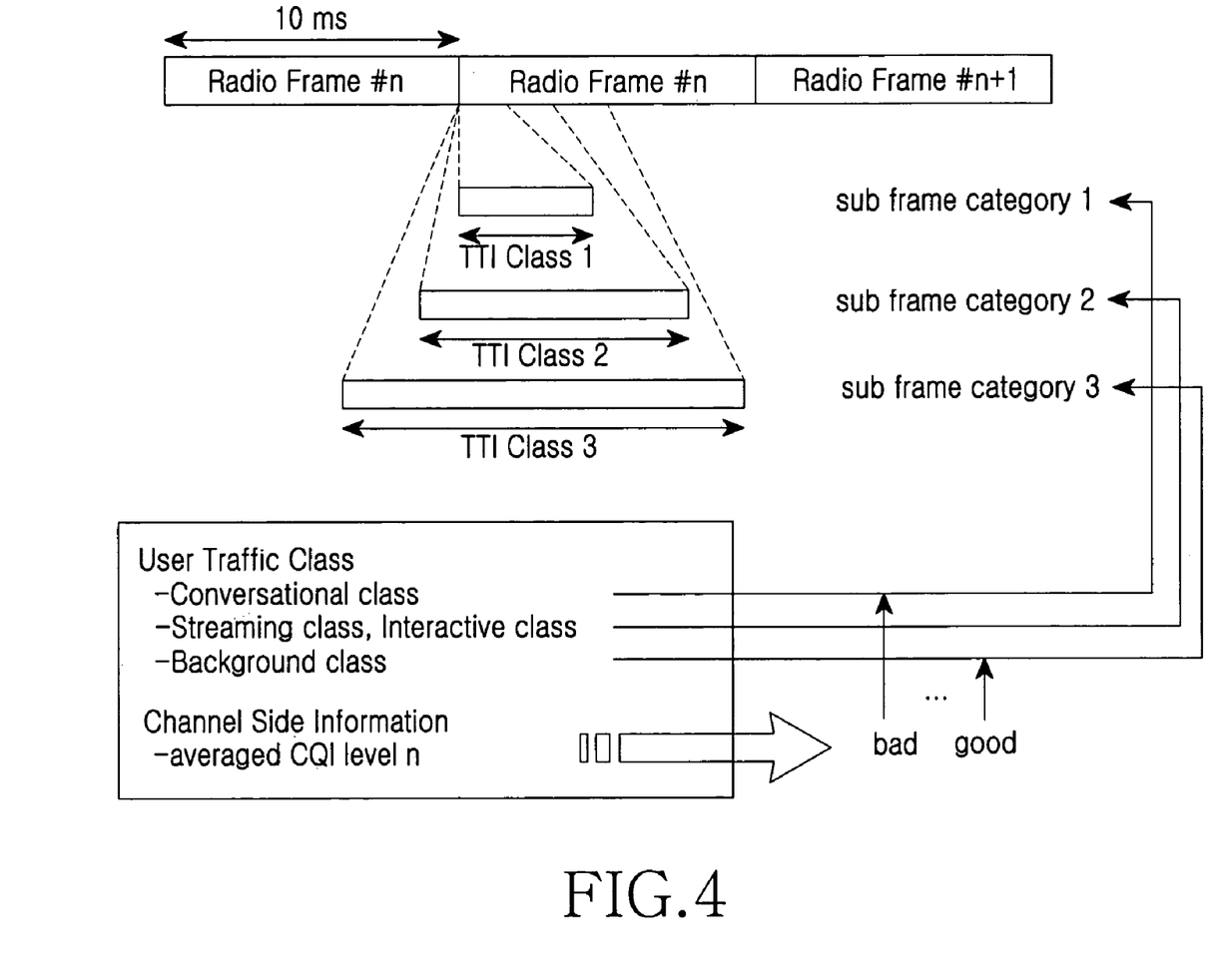
FIG. 4 illustrates a TTI control structure based on service class mapping in accordance with the present invention.

FIG. 4 illustrates a TTI control structure based on service class mapping in accordance with the present invention.

Referring to FIG. 4, a real-time conversational class, for example, a voice of IP (VoIP) service, can be mapped to a shortest TTI class by first considering Quality of Service (QoS). A non-real-time background class can be mapped to a longest TTI class. Other traffic can be mapped to a middle TTI class. The worst channel state can be mapped to a shortest TTI. The best channel state can be mapped to a longest TTI. The present invention is not limited to the above-described examples. For example, a service and a channel state can be simultaneously considered in the present invention.

Figure 5:
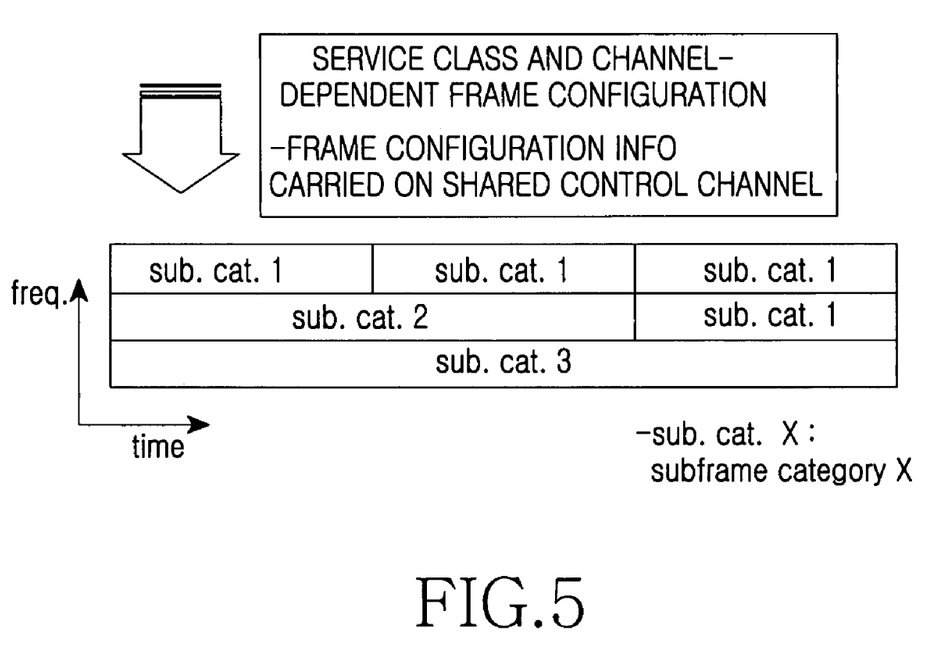
FIG. 5 illustrates an example of an adaptive frame configuration process in a communication system in accordance with the present invention.

FIG. 5 illustrates an example of the adaptive frame configuration process in the communication system in accordance with the present invention. Referring to FIG. 5, the frame configuration process in accordance with the present invention configures a MAC frame mapped to an associated length based on a TTI class. The MAC frame is allocated in a time/frequency domain. The MAC frame can be separated into a finite number of subframe categories according to TTI class. An example of three subframe categories is illustrated in FIG. 3. An MS for receiving the configured frame can use modulation/demodulation information and frame information related to a frame included in a shared control channel.

Figure 6:
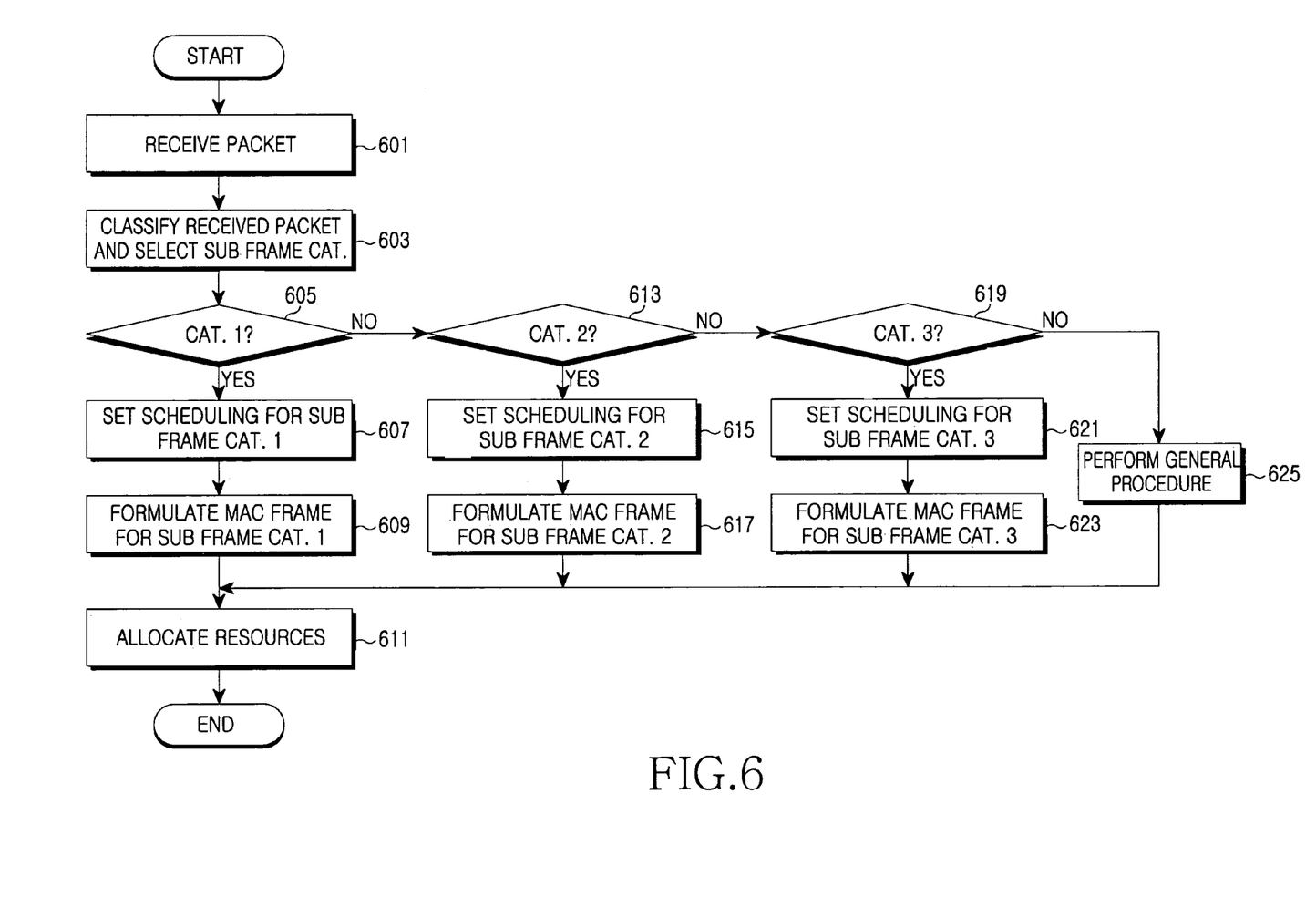
FIG. 6 is a flow chart illustrating an adaptive frame configuration process for controlling a TTI in a communication system in accordance with the present invention.

FIG. 6 is a flow chart illustrating the adaptive resource allocation process in the communication system in accordance with the present invention. Referring to FIG. 6, a BS of the communication system receives a packet from a higher layer in step 601 and then proceeds to step 603. The BS classifies the received packet and selects a subframe category in step 603, and then proceeds to step 605. In step 603, the BS classifies the received packet using service class information and channel information. Then the BS allocates resources by performing scheduling for the subframe category selected in step 603.

In detail, the BS proceeds to step 607 if the subframe category selected in step 603 is determined to be a category 1 in step 605. If the selected subframe category is not the category 1, the BS proceeds to step 613. If the selected subframe category is determined to be the category 1 in step 605, the BS sets scheduling for the selected subframe category 1 in step 607 and then proceeds to step 609. The BS formulates a MAC frame for the selected subframe category 1 in step 609 and then proceeds to step 611 to perform frame concatenation and time-frequency resource allocation.

If the selected subframe category is determined not to be the category 1 in step 605, the BS proceeds to step 613 to determine whether the subframe category selected in step 603 is a category 2. The BS proceeds to step 615 if the subframe category selected in step 603 is determined to be the category 2 in step 613. If the selected subframe category is not the category 2, the BS proceeds to step 619. If the selected subframe category is determined to be the category 2 in step 613, the BS sets scheduling for the selected subframe category 2 in step 615 and then proceeds to step 617. The BS formulates a MAC frame for the selected subframe category 2 in step 617 and then proceeds to step 611 to perform the frame concatenation and time-frequency resource allocation.

If the selected subframe category is determined not to be the category 2 in step 613, the BS proceeds to step 619 to determine whether the subframe category selected in step 603 is a category 3. The BS proceeds to step 621 if the subframe category selected in step 603 is determined to be the category 3 in step 619. If the selected subframe category is determined not to be the category 3, the BS proceeds to step 625. If the selected subframe category is determined to be the category 3, the BS sets scheduling for the selected subframe category 3 in step 621 and then proceeds to step 623. The BS formulates a MAC frame for the selected subframe category 3 in step 623 and then proceeds to step 611 to perform the frame concatenation and time-frequency resource allocation.

If the selected subframe category is determined not to be the category 3 in step 619, the BS proceeds to step 625 to control a TTI as in the conventional communication system and then proceeds to step 611 to perform the frame concatenation and time-frequency resource allocation.

As described with reference to FIG. 6, the adaptive resource allocation process in accordance with the present invention classifies a packet on the basis of service class information and channel information in the TTI mapper when receiving the packet to be transmitted from the higher layer to the MS. At this time, a category of a subframe in which the packet is transmitted is selected. Then frame resources are allocated after scheduling for the selected subframe category.

Herein, a structure of the TTI mapper for selecting a subframe category mapped to a category of a service provided from the higher layer can be expressed as shown in Table 2 below.

TABLE 2

| Service Category | Description |
| --- | --- |
| 1 | UMTS conversational class or IP DiffServ EF class mapping |
| 2 | UMTS streaming class/Interactive class or IP DiffServ AF class mapping |
| 3 | UMTS background class or IP DiffServ BE service |

Table 2 shows one embodiment of a subframe selection structure mapped to a service. In the service category structure of Table 2, the categories are classified according to real-time.

Referring to Table 2, the service category 1 is a category in which "real-time" is most important and the service category 3 is a category of non-real-time traffic such as BES traffic.

Next an example of a TTI class mapping function in accordance with the present invention will be described.

That is, the service category 1 is mapped to one of a UMTS conversational class and IP Differentiated Service (IP Diff-Serv) Expedited Forwarding (EF) class. The service category 2 is mapped to one of a UMTS streaming class/interactive class and IP Assured Forwarding (AF) class. The service category 3 is mapped to one of a UMTS background class and IP DiffServ Best Effort (BE) service class.

In the present invention, the service category 1 is mapped to a subframe category 1, for example, a shortest frame, when a channel state value in traffic of the real-time service category 1 is less than a first threshold. When the channel state value is greater than or equal to the first threshold, the service category 1 is mapped to a middle level, for example, a subframe category 2. In the present invention, an associated subframe is mapped according to the service characteristic and channel information. A process for selecting an associated subframe category according to the service characteristic and channel information in the communication system in accordance with the present invention will be described with reference to FIGS. 7A to 7C.

Figure 7A:
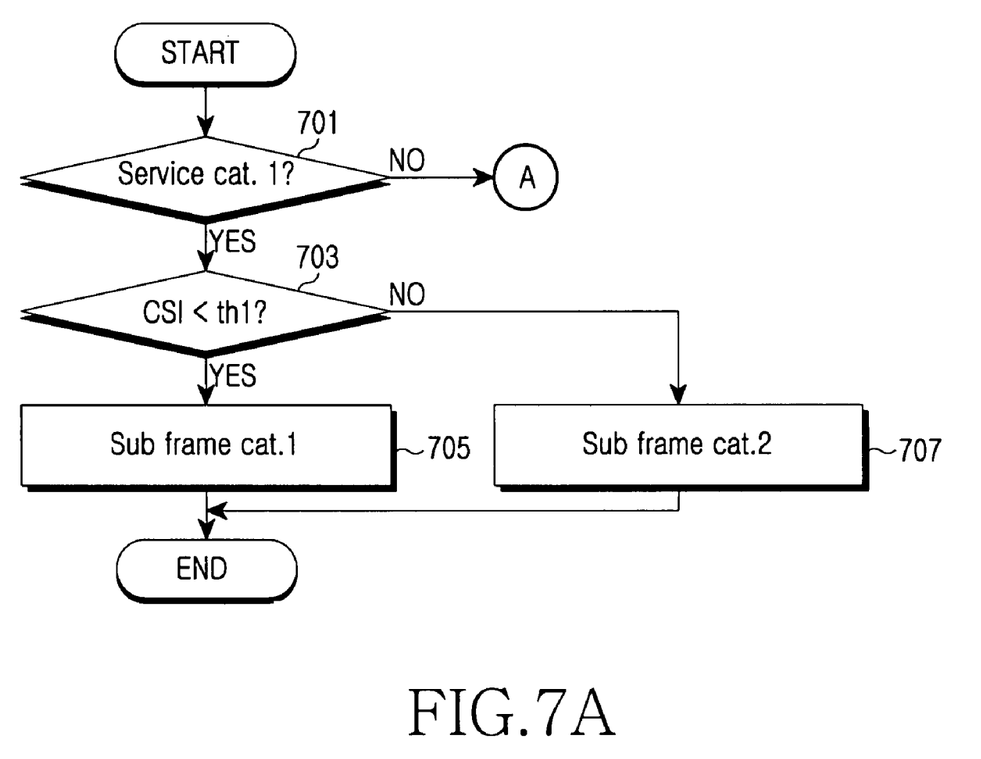
FIGS. 7A to 7C are flow charts illustrating a subframe selection process in accordance with the present invention.
Figure 7B:
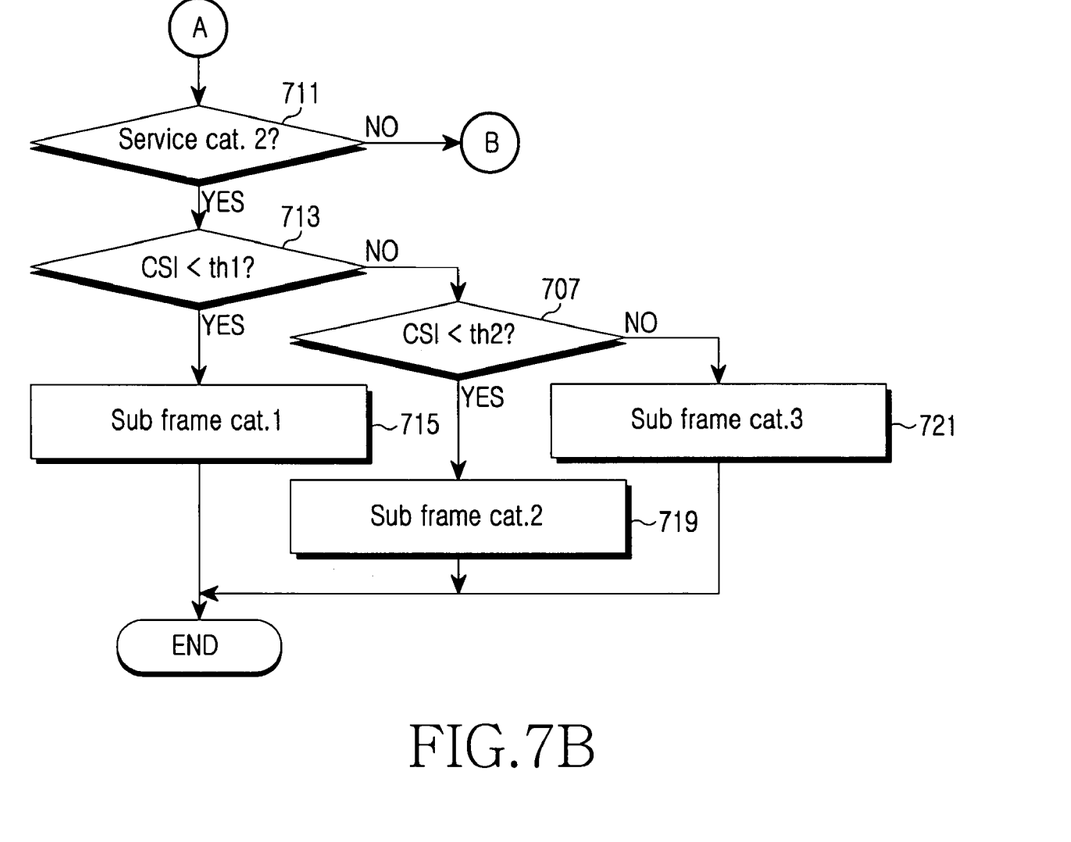
Figure 7C:
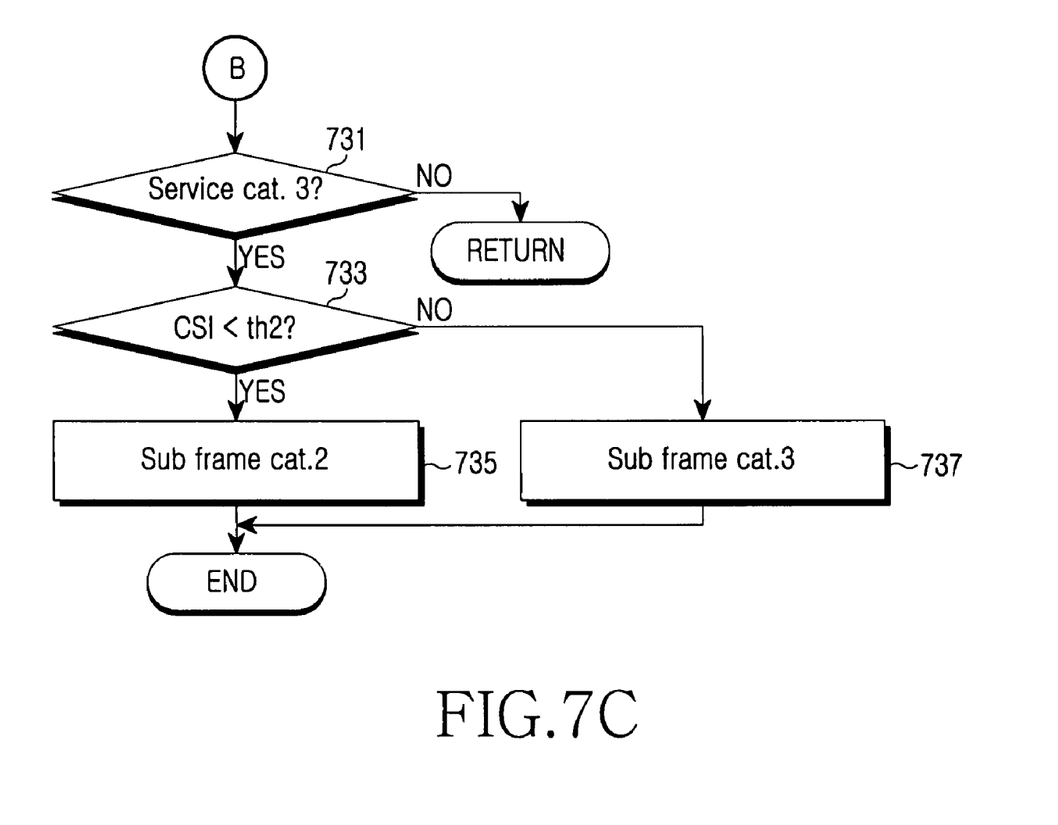

FIGS. 7A to 7C are flow charts illustrating the subframe selection process in accordance with the present invention. Herein, FIGS. 7A to 7C illustrate a structure of the TTI mapper for selecting a subframe category mapped to a category of a service received from the higher layer by considering a channel state in the communication system. Herein, a service category structure is an example of classification according to real-time. For example, the service category 1 is a category in which "real-time" is most important and the service category 3 is a category of non-real-time traffic, for example, BES traffic.

Referring to FIG. 7A, if an associated service category is determined to be the service category 1 in step 701, the process proceeds to step 703 to determine a channel state of the service category 1. That is, Channel State Information (CSI) mapped to the service category 1 is compared with a first threshold set in a communication environment/system.

In step 703, if the CSI of traffic for the service category 1 is determined to be less than the first threshold, the process proceeds to step 705 to perform mapping to a subframe category 1, that is, a shortest frame. In step 703, if the CSI of traffic for the service category 1 is determined to be greater than or equal to the first threshold, the process proceeds to step 707 to perform mapping to a subframe category 2, that is, a middle frame.

Referring to FIG. 7B, if the associated service category is determined not to be the service category 1 in step 701 of FIG. 7A, the process proceeds to step 711. In step 711, if the associated service category is determined to be the service category 2, the process proceeds to step 713 to determine a channel state of the service category 2. That is, CSI mapped to the service category 2 is compared with the first threshold in step 713.

If the CSI of traffic for the service category 2 is determined to be less than the first threshold in step 713, the process proceeds to step 715 to perform mapping to the subframe category 1, that is, the shortest frame. In step 713, when the CSI of traffic for the service category 2 is determined to be greater than or equal to the first threshold, the process proceeds to step 717 to compare the CSI with a second threshold set in the communication environment/system.

In step 717, if the CSI of traffic for the service category 2 is determined to be less than the second threshold, the process proceeds to step 719 to perform mapping to the subframe category 2, that is, the middle frame, according to system setting. In step 717, when the CSI of traffic for the service category 2 is determined to be greater than or equal to the second threshold, the process proceeds to step 721 to perform mapping to a subframe category 3, that is, a longest frame. Herein, the second threshold value is set to be more than the first threshold.

Referring to FIG. 7C, if the associated service category is determined not to be the service category 2 in step 711 of FIG. 7B, the process proceeds to step 731. In step 731, if the associated service category is determined to be the service category 3, the process proceeds to step 733 to determine a channel state of the service category 3. That is, CSI mapped to the service category 3 is compared with the second threshold in step 733. If the associated service category is determined not to be the service category 3, the process returns to the initial step according to system setting.

In step 733, if the CSI of traffic for the service category 3 is determined to be less than the second threshold, the process proceeds to step 735 to perform mapping to the subframe category 2, that is, the middle frame. In step 733, if the CSI of traffic for the service category 3 is determined to be greater than or equal to the second threshold, the process proceeds to step 737 to perform mapping to the subframe category 3, that is, the longest frame.

As described above, resources are allocated through TTI control considering a user service characteristic and channel state in the present invention. In the present invention, a TTI is separated into a finite number of classes by considering system complexity. Unnecessary overhead results since the conventional system has one of a fixed TTI and frame structure. However, in the present invention, a TTI is adaptively selected according to channel characteristic and channel state, a frame is dynamically configured, and resources are allocated.

In the present invention, averaging channel information in a regular period and controlling a TTI can reduce uplink/downlink control information. As the TTI is controlled according to service, a QoS requirement of traffic can be satisfied and wireless MAC header overhead can be adaptively varied. As the overhead is adaptively varied, throughput can be improved. In the present invention, a TTI is separated into a finite number of classes by considering system complexity, such that the difficulty due to unnecessary implementation can be overcome. That is, resources can be allocated by configuring a dynamic frame according to channel information and service class in the exemplary embodiments of the present invention.

As is apparent from the above description, the present invention can reduce uplink/downlink control information by averaging channel information in a regular period and controlling a TTI. Moreover, the present invention can satisfy the QoS requirement of traffic by controlling the TTI according to service and can adaptively vary wireless MAC header overhead. Moreover, the present invention can improve throughput by adaptively varying the overhead. Moreover, the present invention can overcome the difficulty due to unnecessary implementation by considering system complexity and separating a TTI into a finite number of classes. Moreover, the present invention can allocate resources by configuring a dynamic frame according to channel information and service class.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents thereof.

What is claimed is:

1. A method for allocating resources in a communication system, the method comprising:
   mapping a Transmission Time Interval (TTI) class according to downlink channel information transmitted from a mobile station and a service characteristic of downlink traffic transmitted to the mobile station; and
   allocating resources by dynamically configuring a frame according to the mapped TTI class,
   wherein the mapping of the TTI class comprises classifying a packet to be transmitted according to the downlink channel information and the service characteristic of the downlink traffic, and selecting a subframe category corresponding to the mapped TTI class according to the classified packet.

2. The method of claim 1, wherein the mapping the TTI class comprises recording the downlink channel information based on Channel Quality Information (CQI) transmitted from the mobile station.

3. The method of claim 1, wherein the TTI class comprises at least two classes.

4. The method of claim 1, wherein the allocating the resources comprises transmitting frame configuration information to the mobile station through a shared control channel after dynamically configuring the frame.

5. A method for allocating resources in a communication system, the method comprising:
   classifying a packet according to a service characteristic of downlink traffic and downlink channel information when the packet is transmitted from a higher layer;
   selecting a subframe category of the classified packet;
   performing scheduling for the selected subframe category; and
   allocating resources according to the scheduling.

6. The method of claim 5 wherein the scheduling comprises setting scheduling for a subframe category 1 when the selected subframe category is the subframe category 1 and configuring a Medium Access Control (MAC) frame for the subframe category 1; setting scheduling for a subframe category 2 when the selected subframe category is the subframe category 2 and configuring a MAC frame for the subframe category 2; and setting scheduling for a subframe category 3 when the selected subframe category is the subframe category 3 and configuring a MAC frame for the subframe category 3 using the MAC frame for the subframe category 2.

7. The method of claim 5 wherein the selecting the subframe category comprises selecting the subframe category according to a service category of the packet transmitted from the upper layer.

8. The method of claim 7, wherein the service category is classified according to one of a real-time and non-real-time characteristic of the transmitted packet.

9. The method of claim 7, wherein the selecting the subframe category further comprises determining a channel state for a service category and allocating a frame by selecting a subframe category according to a comparison result after comparing the channel state with thresholds.

10. The method of claim 9, wherein the allocating the frame comprises comparing Channel State Information (CSI) of a service category 1 with a first threshold; mapping a frame to a subframe category 1 when the CSI of traffic for the service category 1 is less than the first threshold; and mapping a frame to a subframe category 2 when the CSI of traffic for the service category 1 is greater than or equal to the first threshold.

11. The method of claim 10, wherein the allocating the frame further comprises comparing CSI of a service category 2 with the first threshold; mapping the frame to the subframe category 1 when the CSI of traffic for the service category 2 is less than the first threshold; comparing the CSI with a second threshold when the CSI of the traffic for the service category 2 is greater than or equal to the first threshold; mapping the frame to the subframe category 2 when the CSI of the traffic for the service category 2 is less than the second threshold; and mapping a frame to a subframe category 3 when the CSI of the traffic for the service category 2 is greater than or equal to the second threshold.

12. The method of claim 11, wherein the first threshold is set to be less than the second threshold.

13. The method of claim 11, wherein the allocating the frame further comprises comparing CSI of the service category 3 with the second threshold; mapping the frame to the subframe category 2 when the CSI of traffic for the service category 3 is less than the second threshold; and mapping the frame to the subframe category 3 when the CSI of the traffic for the service category 3 is greater than or equal to the second threshold.

14. The method of claim 5, wherein the selecting the subframe category comprises selecting the subframe category by considering a service characteristic and a channel state of the packet transmitted from the upper layer.

15. The method of claim 5, wherein the allocating the resources comprises performing frame concatenation and time-frequency resource allocation.

16. A system for allocating resources in a communication system, the system comprising:
   a mobile station for periodically transmitting downlink channel information to a base station; and
   the base station for accumulating the downlink channel information transmitted from the mobile station, selecting a Transmission Time Interval (TTI) according to a service characteristic of downlink traffic transmitted to the mobile station and the downlink channel information transmitted from the mobile station, and allocating resources by dynamically configuring a frame according to the selected TTI class,
   wherein the base station classifies a packet to be transmitted according to the downlink channel information and service characteristic of downlink traffic and selects a subframe category corresponding to the selected TTI class according to the classified packet.

17. The system of claim 16, wherein the base station selects the TTI from among a finite number of TTIs according to the service characteristic of downlink traffic and the downlink channel information.

18. The system of claim 16, wherein the base station transmits frame configuration information to the mobile station through a shared control channel after dynamically configuring the frame.

* * * * *